(12) United States Patent
Hooks et al.

(10) Patent No.: US 6,678,991 B2
(45) Date of Patent: Jan. 20, 2004

(54) FISHING POLE HOLDER

(76) Inventors: Cecil D. Hooks, deceased, late of Tatums, OK (US); Chere D Hooks, executrix, 1213½ S. Burnside Ave., Los Angeles, CA (US) 90019

( * ) Notice: Subject to any disclaimer, the term of this patent is extended or adjusted under 35 U.S.C. 154(b) by 0 days.

(21) Appl. No.: 10/196,034

(22) Filed: Jul. 15, 2002

(65) Prior Publication Data

US 2003/0024147 A1 Feb. 6, 2003

Related U.S. Application Data

(60) Provisional application No. 60/309,607, filed on Aug. 2, 2001.

(51) Int. Cl.[7] .............................................. A01K 97/10
(52) U.S. Cl. ..................... 43/21.2; 43/54.1; 224/405; 211/70.8
(58) Field of Search ................. 43/21.2, 54.1, 43/26; 280/79.6, 79.3; 206/315.1, 315.11; 410/97, 34, 35, 36, 42, 121; 211/70.8, 195, 181.1; 224/922, 137, 402, 403, 405; B60R 9/06

(56) References Cited

U.S. PATENT DOCUMENTS

| | | | | |
|---|---|---|---|---|
| 3,780,466 A | * | 12/1973 | Hadnot | 43/17 |
| 3,905,286 A | * | 9/1975 | Le Grady | 99/450 |
| 4,014,466 A | * | 3/1977 | Wess et al. | 294/162 |
| 4,170,801 A | * | 10/1979 | Ward | 114/343 |
| 4,523,403 A | * | 6/1985 | Ivy et al. | 43/17 |
| 4,785,980 A | * | 11/1988 | Redick | 224/535 |
| 4,871,099 A | * | 10/1989 | Bogar, Jr. | 224/566 |
| 5,152,494 A | * | 10/1992 | Frunzar | 248/513 |
| 5,203,815 A | * | 4/1993 | Miller | 43/21.2 |
| 5,571,227 A | * | 11/1996 | Pisarek | 43/21.2 |
| 5,803,519 A | * | 9/1998 | Daigle | 294/159 |
| 5,884,778 A | * | 3/1999 | Freiheit | 211/41.14 |
| 6,047,491 A | * | 4/2000 | De Busk | 43/21.2 |
| 6,457,619 B1 | * | 10/2002 | Werner et al. | 224/405 |

FOREIGN PATENT DOCUMENTS

| | | | | |
|---|---|---|---|---|
| GB | 2178931 A | * | 2/1987 | .......... A01K/97/10 |
| JP | 06105638 A | * | 4/1994 | .......... A01K/97/10 |

* cited by examiner

*Primary Examiner*—Peter M. Poon
*Assistant Examiner*—Joan M. Olszewski
(74) *Attorney, Agent, or Firm*—Marshall A. Lerner, Esq.; Finn T. Simmensen, Esq.; Kleinberg & Lerner, LLP (57) ABSTRACT

A portable fishing pole holder and carrier has a tubular metal frame. A row of posts projects out-of-plane at each end of the frame for cradling one or more fishing poles, which are held in place by elastic cords. Support members depending from the frame hold the frame above a surface or adjacent to it for compact hand carrying. Optionally, magnetic or VELCRO® brand fastening patches anchor the support members to a deck or truck bed. Optionally, the fastening patches stabilize the support members when the support members are positioned adjacent the frame. Optionally, the frame or the support members may have wheels or handles. Optionally, a support member serves as a handle.

12 Claims, 7 Drawing Sheets

FISHING POLE HOLDER

This application claims the benefit of prior copending U.S. Application Ser. No. 60/309,607, filed Aug. 2, 2001, the entirety of which is incorporated herein by reference.

BACKGROUND OF THE INVENTION

1. Field of the Invention

The present invention relates to article-storing racks for free-standing or vehicular use and to article-carrying devices, more particularly to such items for storing or carrying elongated objects, and especially to holders for storing or carrying fishing poles.

2. Description of the Related Art

An individual driving a van, a pickup truck, or a station wagon to a favorite fishing spot might wish he could keep a number of fishing poles arranged securely, apart from one another, and at an appropriate height and orientation. Arriving, he or she might wish to carry the fishing poles to a deck or boat and stow them there without disturbing their arrangement. Such a person would find it helpful to have a portable fishing pole holder.

SUMMARY OF THE INVENTION

It is an object of the present invention to support several fishing poles in a parallel and spaced apart arrangement above the bed of a cargo compartment of a pickup truck, van, or station wagon.

It is an additional object of the present invention to provide for the convenient removal of the fishing poles from the vehicle and their hand-carrying to a second location, where they are again supported and their arrangement is preserved.

Additional objects of the present invention are to provide a fishing pole holder which may conveniently be anchored to a cargo space of a vehicle, which is easily configured either for carrying or for storing, which consists of simple parts and inexpensive materials, and which may be loaded either front-first or back-first into a vehicle cargo space while preserving its other advantages.

In accordance with these objects and with others which will be described and which will become apparent, an exemplary embodiment of a fishing pole holder in accordance with the present invention comprises a rectangular tubular metal frame. A row of posts projects out-of-plane with the frame from each end of the frame. The posts cradle one or more fishing poles which are to be placed lengthwise on top of the frame. An elastic cord with hooked ends spans each end of the frame from side to side and holds the fishing poles against the frame. Support members depend from the frame and lock in position to hold the frame at a convenient height above a deck, truck bed, or other surface. The support members can be unlocked and rotated to a compact position against the frame for storage and, importantly, for convenient hand-carrying of the fishing pole holder.

Optionally, the fishing pole holder in accordance with the present invention comprises fastening patches for anchoring the fishing pole holder to a deck or truck bed. In one exemplary embodiment, the fastening patches incorporate magnets for convenient anchoring to a steel deck or truck bed. Alternatively, VELCRO® brand fasteners are arranged to anchor the support members to a deck or truck bed and also to anchor to one another for keeping the support members folded against the frame when it is to be carried.

Optionally, the frame or the support members may be equipped with wheels for rolling the fishing pole holder over a flat surface or for hand-towing it over terrain. Optionally, a support member may swing out to a position of 180° relative to the frame, so that it may be used as a handle for hand-towing the fishing pole holder.

It is an advantage of the present invention that several fishing poles may be kept together in a desired arrangement as they are stored, transported, hand-carried, and set up at a fishing location.

It is an additional advantage of the present invention that the fishing poles are held at a safe height above water and debris on a deck and at a convenient height for retrieving fishing poles from a pickup truck bed.

It is an additional advantage of the present invention that the fishing pole holder is easily withdrawn from and returned to a vehicle cargo space and easily anchored therein.

BRIEF DESCRIPTION OF THE DRAWINGS

For a further understanding of the objects and advantages of the present invention, reference should be had to the following detailed description, taken in conjunction with the accompanying drawing, in which like parts are given like reference numbers and wherein.

DESCRIPTION OF THE PREFERRED EMBODIMENTS

The invention will now be described with reference to FIG. 1, which illustrates in perspective view a preferred embodiment of a fishing pole holder in accordance with the present invention shown generally by the reference number 40. The fishing pole holder 40 comprises a rectangular frame 42, which in turn comprises a left side member 44, a right side member 46, a front end member 48, and a back end member 50.

A front support member 52 depends from the frame 42 proximate the front end member 48 and comprises a front left leg 54 rotatably attached through a hinge 70 to the left side member 44, a front right leg 56 rotatably attached through a hinge 68 to the right side member 46, and a front leg cross-member attached to the front left leg 54 and to the front right leg 56. In like manner, a back support member 60 depends via hinges 68 from the frame 42 proximate the back end member 50 and comprises a back left leg 62, a back right leg 64, and a back leg cross-member 66.

The front support member 52 and the back support member 60 support the frame 42 at a height substantially determined by the length of the legs 54, 56, 62, and 64 and by the angles at which they are disposed relative to the frame 42. The hinges 68 are selected to have sufficient resistance to rotation to be able to hold the support members 52 and 60 at desired angles relative to the frame 42.

Figure 1:
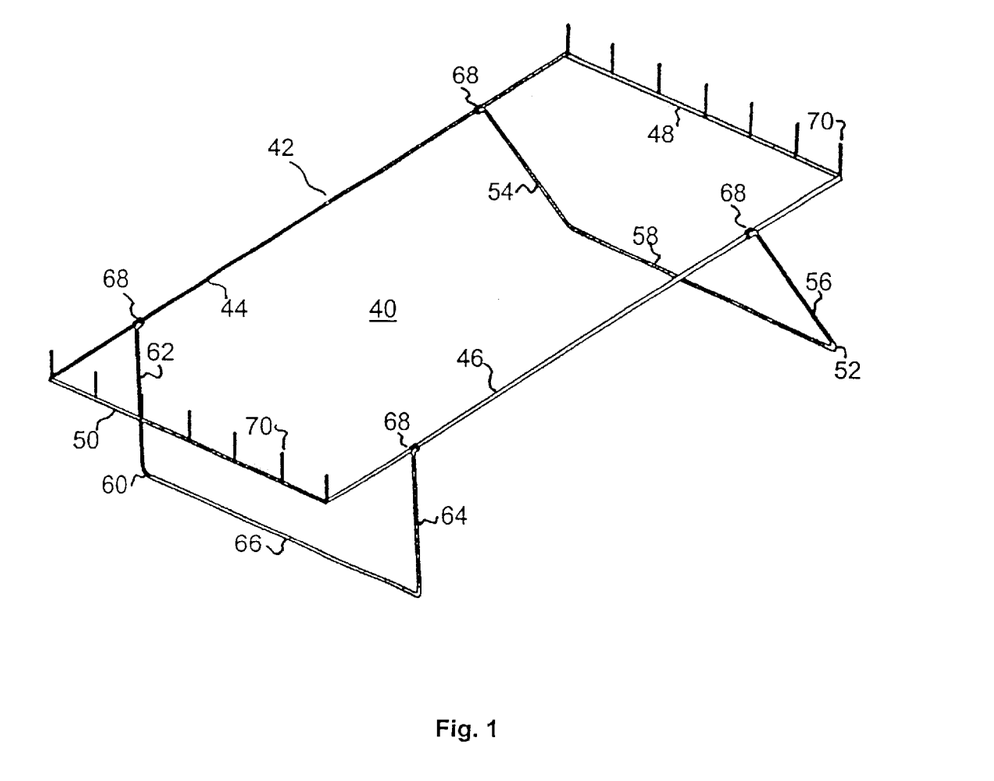
FIG. 1 is a perspective view of a fishing pole holder in accordance with the present invention.

With continued reference to FIG. 1, the left side member 44 and the right side member 46 are approximately 1.5 meter in length, the front end member 48 and back end member are approximately 0.8 meter in length, and the legs 54, 56, 62, and 64 are approximately 0.4 meter in length. Thus, when positioned approximately perpendicular to the frame 42, the support members 52 and 60 hold the frame 42 about 0.4 meter above any supporting surface.

Figure 2:
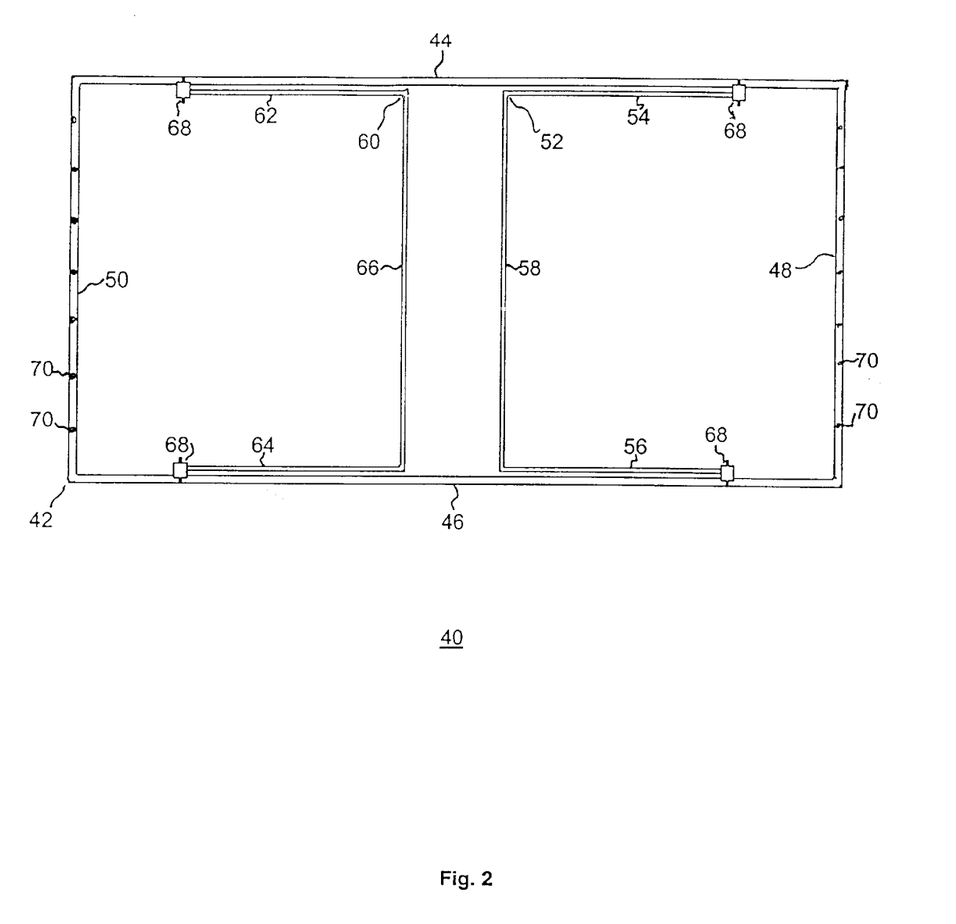
FIG. 2 is a plan view of a fishing pole holder in accordance with the present invention as viewed from above.

With reference to FIG. 2, which illustrates a top plan view of an exemplary embodiment of a fishing pole holder in accordance with the present invention, the hinges 68 are also selected to allow the support members 52 and 60 to be rotated such that they are approximately parallel to and proximate the frame 42. With the support members 52 and 60 so positioned, the fishing pole holder 40 is in a compact, flat configuration which lends itself to saving space. In this configuration, the fishing pole holder 40 may rest flat atop other cargo or may be tipped up on edge or on end against or between other cargo items. Additionally, the fishing pole holder may be hand-carried, preferably by grasping a central portion of a side member 42 or 46.

With reference again to FIG. 1, the front end member 48 and the back end member 50 each form a plurality of spaced apart upwardly projecting posts 70, each post 70 being approximately 0.15 meter in length and 1 centimeter in diameter. Each post 70 on the font end member 48 is aligned with a corresponding post 70 on the back end member 50.

Figure 3:
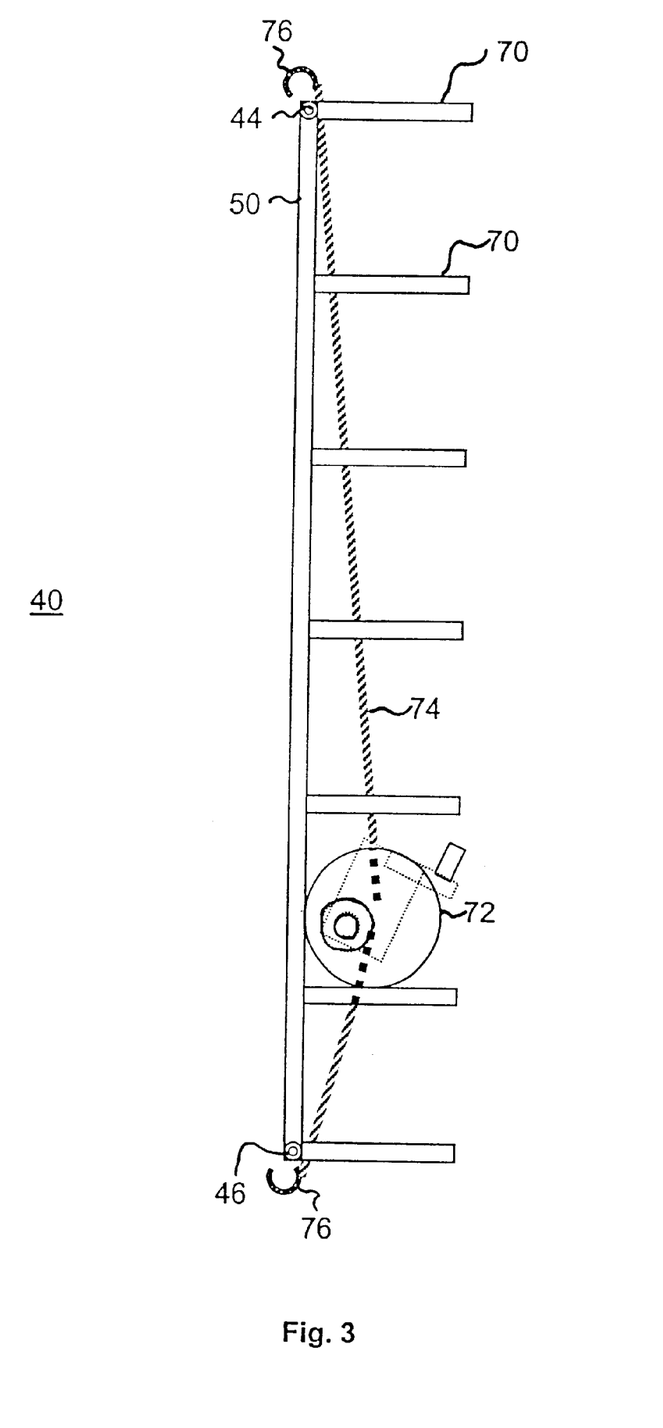
FIG. 3 is a front end view of a fishing pole holder in accordance with the present invention.

With reference to FIG. 3, a fishing pole 72 is placed lengthwise upon the frame 42 with its ends resting on the front end member 48 (not shown in FIG. 3) and the back end member 50 and cradled between adjacent posts 70. The posts 70 reduce the chance that the fishing poles 72 and their respective lines will become entangled. An elastic cord 74 is attached by hooks 76 to the left side member 44 and the right side member 48 and secures the fishing pole 72 to the frame 42.

With reference generally to FIGS. 1–3, it will be appreciated that a person may swing the support members 52 and 60 to a roughly perpendicular position, rest the fishing pole holder 40 on the support members 52 and 60 in the bed of a truck or wagon, place one or more fishing poles 72 on the fishing pole holder 40, and secure them with one or more elastic cords 74 (two are recommended—one proximate each end member 48 and 50). The support members 52 and 60 will elevate the frame 42 to a convenient height above the truck bed where they may easily be retrieved by a person standing adjacent the truck bed and where they are protected from water and debris. Later, the person may, for example, open the tailgate of the pickup truck, withdraw the fishing pole holder 40 from the truck, rotate the support members 52 and 60 to their parallel positions, and carry the fishing pole holder 40, with the fishing poles 72 secured thereto, by grasping the left side member 44 or the right side member 46 with one hand.

The frame 42 and support members 52 and 60 are formed of bent aluminum tubing having a diameter of approximately 20 millimeters. Alternatively, these structures may be formed of a different metal, or of wood, plastic, composite, or other suitable material. The posts 70 are formed as wooden dowels or as tubes or rods of metal or plastic. Low mass, high stiffness, and tolerance of salt water and abrasive contaminants are preferred characteristics for the aforementioned structures. They are joined by any common means such as a press-fit, a weld, a braze, an adhesive, or a fastener. Optionally, a variety of prefabricated snap-locking fasteners may be used to provide for ready assembly without tools, and may be formed integrally with the aforementioned structural elements to reduce manufacturing costs. Optionally, a vinyl or resinous coating may be applied to improve appearance or inhibit corrosion.

The hinges 68 are formed by, for example, passing a bolt through a bore in an end of a leg 54, 56, 62, and 64 and a corresponding bore in a side member 44 and 46, and securing the bolt with a nut and a washer. The nut may be tightened or loosened to allow rotation of the hinge. Alternatively, a prefabricated metal or plastic hinged fitting may be used to form the hinge 68 having suitable frictional or locking characteristics to hold each support member 52 and 60 at a desired angle relative to the frame 42. Alternatively, a rivet may be used in conjunction with a strap, stop, or locking mechanism for keeping the hinge at a desired angle. High stiffness and tolerance of salt water and abrasive contaminants are preferred characteristics for the hinges 68.

Figure 4:
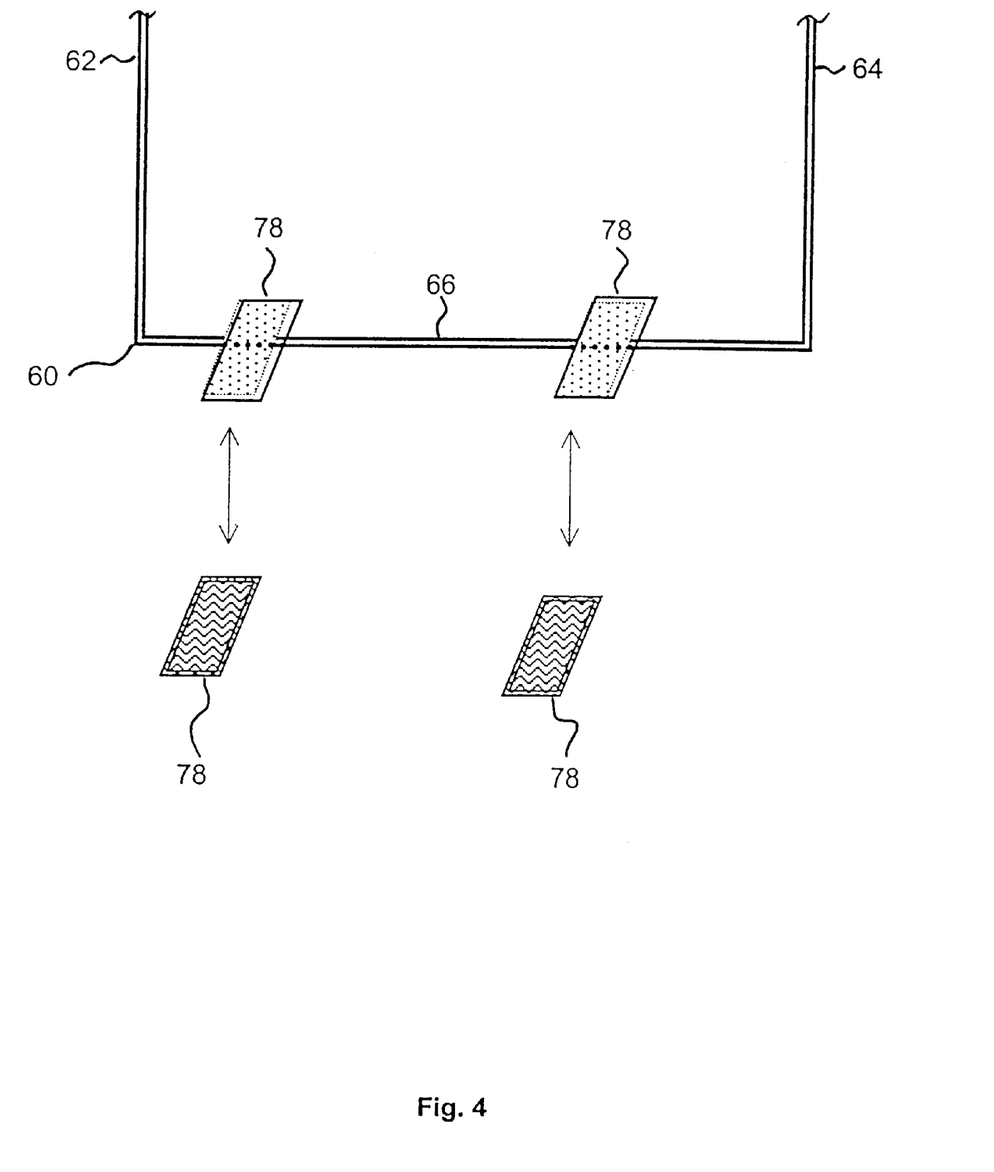
FIG. 4 is an end view of a portion of of a fishing pole holder in accordance with the present invention.

With reference to FIG. 4, two VELCRO® brand fastening patches 78 are attached to each of the front leg cross-member 58 and the back leg cross-member 66. Four complementary VELCRO® fastening patches 78 (only two of which are are shown in FIG. 4) are provided for permanent attachment to the bed of a pickup truck and for easy temporary anchoring of the cross-members 58 and 66 to the bed of the pickup truck. Anchoring the fishing pole holder 40 to the truck bed (or to a boat deck) prevents the fishing pole holder 40 from sliding around and thus protects a vehicle or boat from being scratched. It is to be understood that "VELCRO® brand" as used herein refers to a famous fastener system comprising a first half-fastener, surfaced with a loop-pile gauze, and a second half-fastener, surfaced with loop-ensnaring resilient hooks. The first and second half-fasteners are complementary in that each adheres to the other and not necessarily to its own kind.

Optionally, the VELCRO® brand fastening patches 78 may be so arranged that they may also be used to perform the function of anchoring the support members 52 and 60 to one another when the support members 52 and 60 are positioned adjacent the side members 46 and 48 for hand-carrying, thereby simplifying the design requirements of the hinges 68 for holding that particular hinge position. To support this function, each fastening patch 78 is made long enough that the fastening patches 78 will span any gap between the back leg cross-member 66 and the front leg cross-member 58 when both of the support members 52 and 60 are positioned adjacent the frame 42.

To preserve this function while at the same time preserving the ability of the VELCRO® brand fastening patches 78 to match up with complementary VELCRO® brand fastening patches 78 permanently anchored to the truck bed, each VELCRO® brand fastening patch 78 should be of the same type as its diagonal opposite. In this way, it will not matter whether the fishing pole holder 40 is loaded into the truck bed front-first or back-first; either way, the VELCRO® brand fastening patches 78 attached to the fishing pole holder 40 will adhere to their complementary patches anchored to the truck bed.

Figure 5:
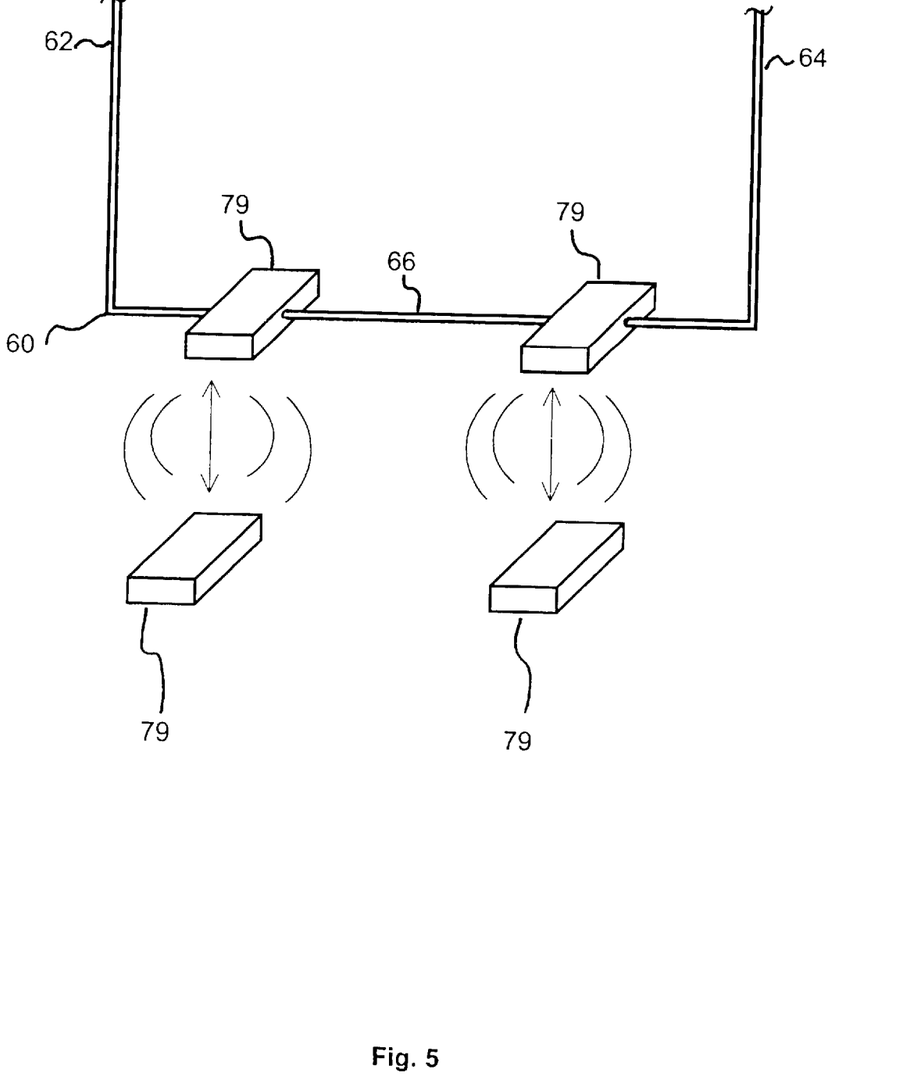
FIG. 5 is an end view of a portion of an embodiment of the fishing pole holder in accordance with the present invention.

Alternatively, magnets 79 (FIG. 5), snaps, or other fastener systems may be substituted for VELCRO® brand fasteners. The fastening patches 78 are attached to the cross members 58 and 66 by adhesive, or by rivets, or by being stitched to form a loop about the tubing of the cross members 58 and 66.

Optionally, one or more handles may be formed in or attached to the frame 42. Preferably, such a handle is positioned and designed to allow a person to shift his or her grip to a point along the length of the side member 44 or 46 which compensates for any imbalance in the weight of the fishing poles 72.

Optionally, the posts 70 are adjustable in their separation. This object may be served by providing additional points of attachment on the front and rear end members 48 and 50 and additionally providing posts 70 which may be removed and reattached at any of the attachment points. A threaded post 70, a threaded nut, a Timmerman-style clip, or other suitable releasable fastening arrangement will serve this purpose.

Figure 6:
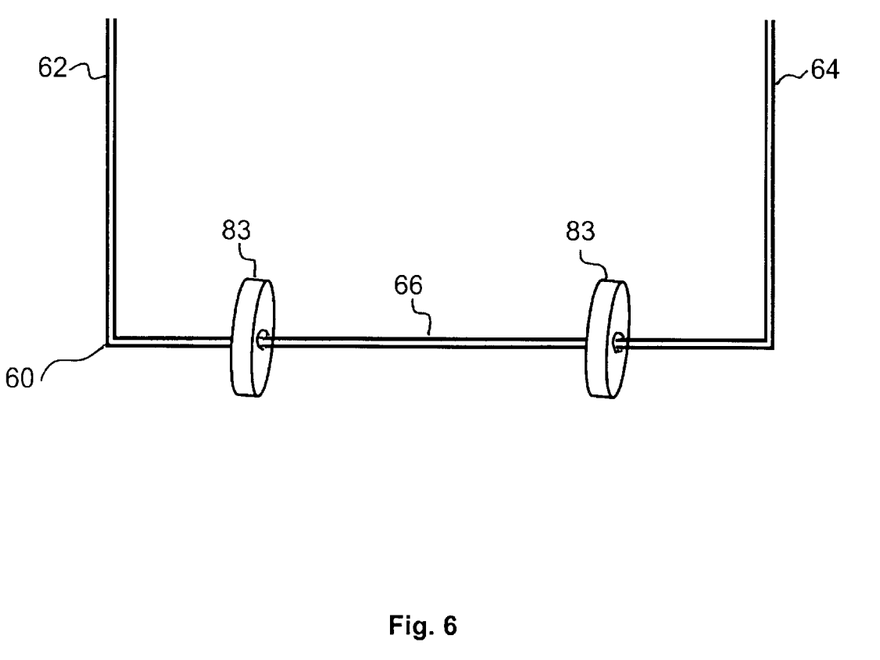
FIG. 6 is an end view of a portion of an embodiment of the fishing pole holder in accordance with the present invention.
Figure 7:
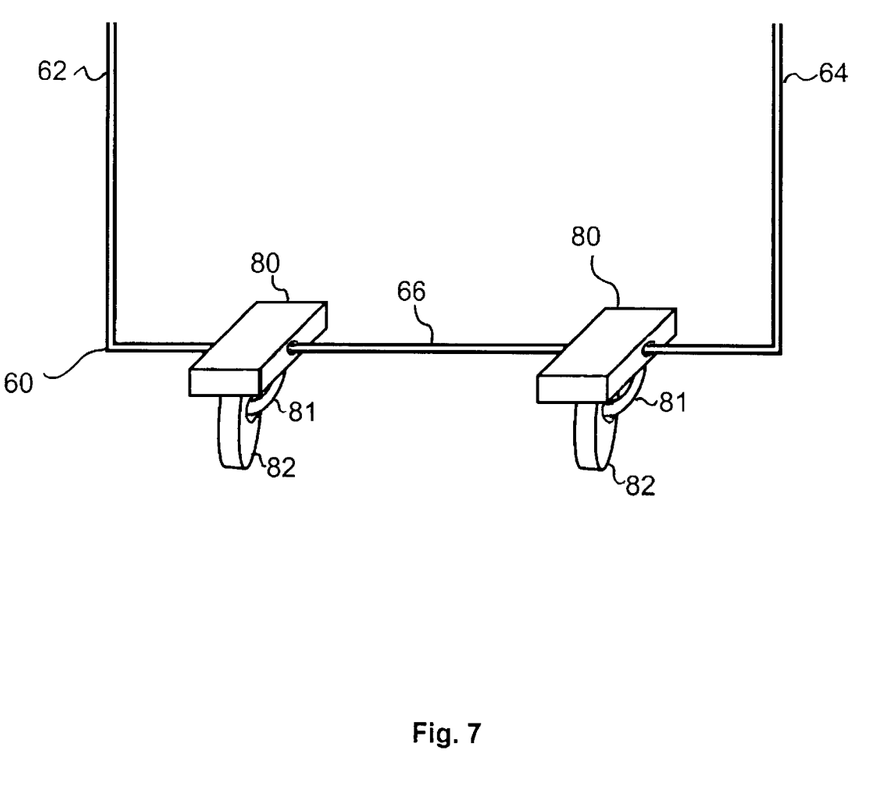
FIG. 7 is a schematic end view of a portion of an embodiment of the fishing pole holder in accordance with the present invention.

Optionally, wheels are attached to the cross members 58 and 66, such that, when the support members 52 and 60 are positioned perpendicular to the frame 42 to support the fishing pole holder 40 above a surface, the weight of the fishing pole holder 40 rests on the wheels. The wheels (83, FIG. 6) may be mounted directly on the cross members 58 and 66, or (82, FIG. 7) they may be mounted to small brackets allowing them to be rotated into position when desired or rotated upwards toward the frame when not desired. The wheels are spaced apart sufficiently to keep the frame 42 parallel with the support surface. Alternatively, one or more wheels may be attached to one or both of the end members 48 and 50, permitting a person to tow the fishing pole holder 40 by grasping one end member 48 while allowing the other end member 50 to rest upon the wheels. Optionally, the person may rotate the back support member 60 to a position 180° opposite the side members 44 and 46 and use the back support member 60 as a handle for towing the fishing pole holder 40. The use of the back support member 60 as a handle allows clearance between the person's hand and the fishing poles that might interfere with his or her grasping the back end member 50.

While the foregoing detailed description has described several embodiments of a fishing pole holder 40 in accordance with the present invention, it is to be understood that the above description is illustrative only and not limiting of the disclosed invention. For example, the frame 42 may be ellipsoidal instead of rectangular, thereby permitting its construction from a single hoop-like piece of tubing. The posts 70 may be formed integrally with the frame 42 by, for example, a molding process. The posts 70 may be articulated or collapsible. The front and back end members 48 and 50 may be movably attached to the side members 44 and 46; so that each row of posts 70 may be pointed toward the other to provide a flattened configuration of the fishing pole holder 40 for compact storage. The side members 44 and 46 may include a telescoping arrangement to render the fishing pole holder 70 more compact. Indeed, it will be appreciated that the embodiments discussed above and the virtually infinite embodiments that are not mentioned could easily be within the scope and spirit of the present invention. Thus, the present invention is to be limited only by the claims.

What is claimed is:

1. A fishing pole rack, comprising:
    a pole-supporting frame having front and back end members and left and right side members;
    a plurality of separators projecting upwardly from each of said front and back end members;
    a front support member, said front support member comprising a distal portion for contacting a ground surface, a left proximal portion adjustably attached to said left side member proximate said front end member, and a right proximal portion adjustably attached to said right side member proximate said front end member;
    a back support member, said back support member comprising a distal portion for contacting a ground surface, a left proximal portion adjustably attached to said left side member proximate said back end member, and a right proximal portion adjustably attached to said right side member proximate said back end member;
    each of said front and back support members being adjustable to a supporting configuration wherein said distal portion projects downward beneath said frame;
    each of said front and back support members being adjustable to a retracted configuration wherein said distal portion is proximate said frame; and wherein said plurality of separators project upwardly when said support members are in either the retracted or supporting configuration.

2. A fishing pole rack as set forth in claim 1, wherein at least one of said support members is adjustable to an endwise-projecting position wherein said distal portion projects lengthwise beyond one of said front and rear end members.

3. A fishing pole rack as set forth in claim 1, further comprising at least one fastener attached to a distal portion of one of said support members.

4. A fishing pole rack as set forth in claim 1, further comprising at least one wheel attached to a distal portion of one of said support members.

5. A fishing pole rack as set forth in claim 1, further comprising at least one cord, said cord being attachable to said frame for securing items to said frame.

6. A fishing pole rack as set forth in claim 1, wherein at least one of said plurality of separators is removable from one of said end members.

7. A fishing pole rack as set forth in claim 1, comprising:
    a front support member having a front left distal portion with front left half-fastener affixed thereto and a front right distal portion with front right half-fastener affixed thereto;
    a rear support member having a rear left distal portion with rear left half-fastener affixed thereto and a rear right distal portion with rear right half-fastener affixed thereto;
    said front left half-fastener and said rear left half-fastener being adapted to join together, and said front and rear right half-fasteners being likewise adapted, whereby said distal portions of said front and rear support members are securable proximate said frame when in said retracted configuration.

8. A fishing pole rack as set forth in claim 7, further comprising at least one fitting, said fitting being adapted for installation in a vehicle bed, said fitting comprising a half-fastener adapted to join together with at least one of said half-fasteners on said distal ends of said support members.

9. A fishing pole rack as set forth in claim 7, wherein diagonally opposite half-fasteners are identical.

10. A fishing pole rack as set forth in claim 3, wherein said at least one fastener comprises a magnet.

11. A fishing pole rack as set forth in claim 7, wherein said half-fasteners are joined together by a magnetic attraction.

12. A fishing pole rack as set forth in claim 1, wherein said plurality of separators projects upwardly and perpendicular to said left and right side members.

\* \* \* \* \*